(12) United States Patent
Arnault et al.

(10) Patent No.: US 10,119,573 B2
(45) Date of Patent: Nov. 6, 2018

(54) PISTON BEARING UNIT, CLUTCH, TRANSMISSION AND LOCKING DIFFERENTIAL HAVING THE PISTON BEARING UNIT

(71) Applicants: Benoit Arnault, Saint-Cyr-sur-Loire (FR); Eric Baudez, Fondettes (FR); Andreas Heile, Bad Kissingen (DE); Gwenael Le Bars, Leichlingen (FR); Robert D. Pecak, Naperville, IL (US); Lance A Petzold, Oswego, IL (US); Thomas Wolf, Schweinfurt (DE); Roland Worsley, Langenfeld (DE)

(72) Inventors: Benoit Arnault, Saint-Cyr-sur-Loire (FR); Eric Baudez, Fondettes (FR); Andreas Heile, Bad Kissingen (DE); Gwenael Le Bars, Leichlingen (FR); Robert D. Pecak, Naperville, IL (US); Lance A Petzold, Oswego, IL (US); Thomas Wolf, Schweinfurt (DE); Roland Worsley, Langenfeld (DE)

(73) Assignee: AKTIEBOLAGET SKF, Gothenberg (SE)

( * ) Notice: Subject to any disclaimer, the term of this patent is extended or adjusted under 35 U.S.C. 154(b) by 469 days.

(21) Appl. No.: 14/819,470

(22) Filed: Aug. 6, 2015

(65) Prior Publication Data
US 2016/0053813 A1 Feb. 25, 2016

(30) Foreign Application Priority Data

Aug. 19, 2014 (EP) ..................................... 14306287

(51) Int. Cl.
*F16C 41/00* (2006.01)
*F16C 27/08* (2006.01)
(Continued)

(52) U.S. Cl.
CPC .............. *F16C 41/00* (2013.01); *F16C 19/30* (2013.01); *F16C 19/305* (2013.01);
(Continued)

(58) Field of Classification Search
None
See application file for complete search history.

(56) References Cited

U.S. PATENT DOCUMENTS 3,970,177 A * 7/1976 Garrett .................. F16D 25/086
192/109 A
4,560,051 A * 12/1985 Brandenstein ........ F16D 25/083
192/110 B
(Continued)

FOREIGN PATENT DOCUMENTS

CN 103967940 A 8/2014
DE 2924234 A1 4/1980
(Continued)

*Primary Examiner* — Mark A Manley
(74) *Attorney, Agent, or Firm* — Bryan Peckjian; SKF USA Inc. Patent Dept.

(57) ABSTRACT

A piston bearing unit having an actuating piston which has a receiving region. The actuating piston is designed to actuate an element by way of a linear movement. The piston bearing unit also comprises a bearing having a first raceway and a second raceway, wherein the bearing is designed for mounting the actuating piston rotatably with respect to the element. The first raceway and the second raceway are at least partially accommodated in the receiving region.

7 Claims, 3 Drawing Sheets

(51) Int. Cl.
    *F16C 27/06*         (2006.01)
    *F16C 19/30*         (2006.01)
    *F16D 25/08*         (2006.01)
    *F16D 23/14*         (2006.01)
    *F16C 19/16*         (2006.01)

(52) U.S. Cl.
    CPC ............ *F16C 27/066* (2013.01); *F16C 27/08* (2013.01); *F16D 23/14* (2013.01); *F16D 25/083* (2013.01); *F16C 19/163* (2013.01); *F16C 2361/43* (2013.01)

(56) References Cited

U.S. PATENT DOCUMENTS

| | | | |
|---|---|---|---|
| 4,566,578 A | | 1/1986 | Leigh-Monstevens et al. |
| 4,579,465 A | | 4/1986 | Horner |
| 4,650,054 A | * | 3/1987 | Fadler ................ B60K 23/02 192/101 |
| 4,687,084 A | * | 8/1987 | Leigh-Monstevens ................ F16D 23/14 192/70.13 |
| 5,641,049 A | | 6/1997 | Kajitani et al. |
| 5,655,639 A | * | 8/1997 | Villata ................ F16D 25/085 192/85.52 |

FOREIGN PATENT DOCUMENTS

| | | |
|---|---|---|
| DE | 4324437 A | 1/1995 |
| DE | 4324437 A1 | 1/1995 |
| WO | 2005052401 A1 | 6/2005 |

* cited by examiner

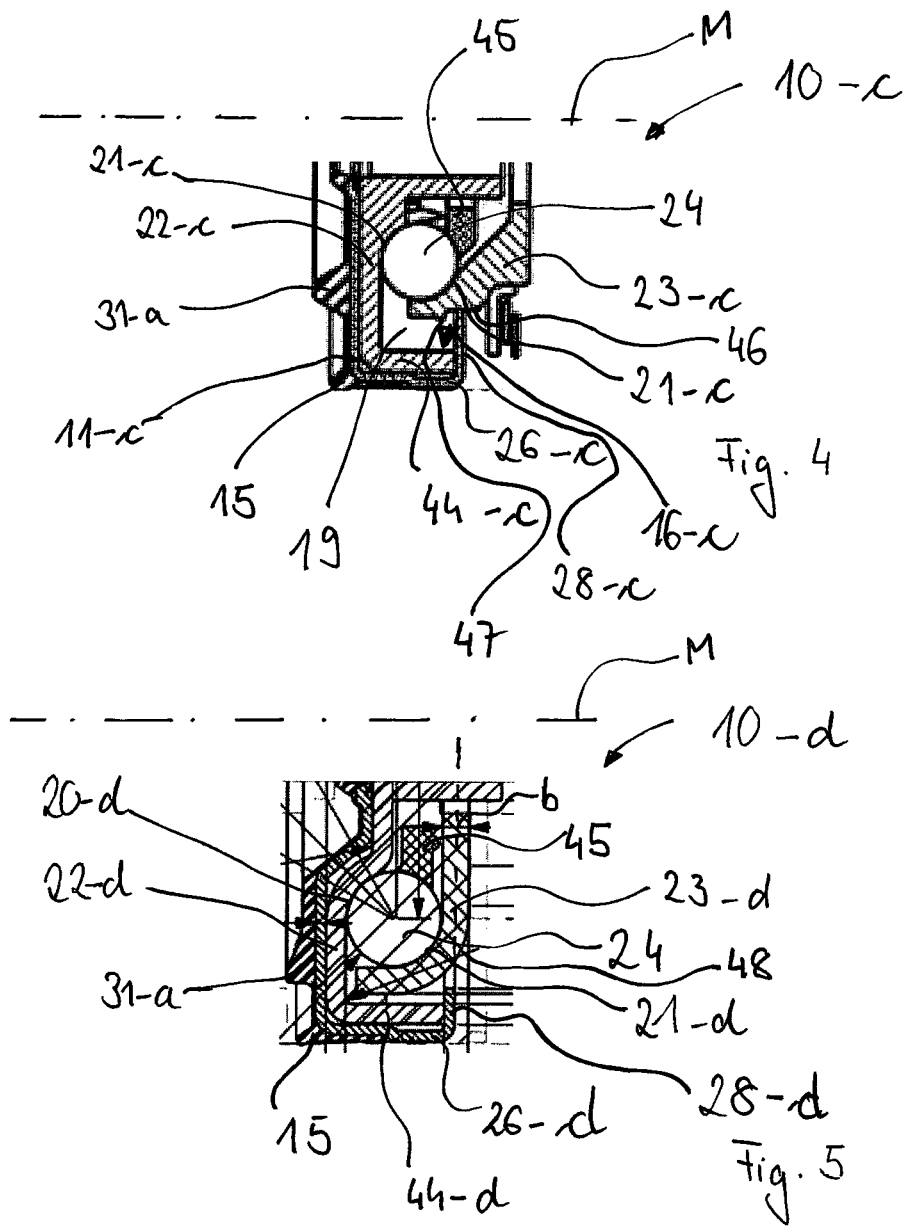

PISTON BEARING UNIT, CLUTCH, TRANSMISSION AND LOCKING DIFFERENTIAL HAVING THE PISTON BEARING UNIT

CROSS REFERENCE TO RELATED APPLICATIONS

This is a Non-Provisional Patent Application, filed under the Paris Convention, claiming the benefit of Europe (EP) Patent Application Number 14306287.5, filed on 19 Aug. 2014 (19.08.2014), which is incorporated herein by reference in its entirety.

TECHNICAL FIELD OF THE INVENTION

Exemplary embodiments relate to a piston bearing unit, a transmission, a clutch and a locking differential having the piston bearing unit.

PRIOR ART

Actuating pistons are used for actuating a multiplicity of different elements. The actuating piston may be driven for example by a hydraulic or pneumatic means. For this purpose, actuating pistons can normally convert a hydraulic or pneumatic pressure into a linear movement. By way of the linear movement, it is then possible, for example, for the element to be operated or for a position of the element to be changed. Such elements may for example be a clutch in a transmission, a valve or a switch.

For example, an actuating piston in the form of an annular piston may be used in a locking differential. In the locking differential, the actuating piston, which is subjected to a fluid pressure, moves a clutch pack of a clutch. Here, the actuating piston and the clutch pack are arranged in a housing, which is composed for example of aluminum. The actuating piston is often also produced from aluminum. To seal off a pressure chamber in the housing or build up a required pressure, use is normally made of a seal in the form of an O-ring. The seal is received in a groove of the actuating piston. To mount the actuating piston rotatably with respect to the clutch pack, an axial roller bearing is arranged between the actuating piston and the clutch pack as viewed in the axial direction of the transmission. Here, the axial roller bearing is supported on a Z-shaped disc which also holds a return spring for the actuating piston. By virtue of the fact that the actuating piston does not rotate with the clutch pack, it is possible under some circumstances for rotating masses to be reduced. The axial roller bearing is moved along the axial direction by means of the actuating piston under the action of hydraulic pressure. With the seal, the Z-shaped disc, the return spring and the bearing, there is a relatively large number of individual parts, which can result in cumbersome installation.

The increased number of individual parts, and associated difficulties that may arise during installation, may also be disruptive or undesirable in other actuating piston applications.

There is thus a demand for providing an improved concept for an actuating piston and the bearing arrangement thereof. The demand is provided for by a piston bearing unit, a clutch, a transmission or a locking differential according to the present invention as disclosed herein.

BRIEF SUMMARY OF THE PRESENT INVENTION

Exemplary embodiments relate to a piston bearing unit having an actuating piston. An element can be actuated by way of a linear movement of the actuating piston. The piston bearing unit also has a bearing which is designed for mounting the actuating piston rotatably with respect to the element. For this purpose, use is made of a bearing that comprises a first and a second raceway. The bearing and the two raceways are accommodated at least partially in a receiving region of the actuating piston.

Exemplary embodiments also relate to a clutch, a transmission and/or a locking differential having a piston bearing unit according to at least one of the exemplary embodiments. The element to be actuated may then be, for example, an input side of a clutch.

By virtue of the fact that the bearing is accommodated at least partially in the actuating piston or in the receiving region thereof, it is possible, in some exemplary embodiments, for the piston bearing unit to be installed at least with a reduced number of individual parts, or even in unipartite form. Assembly can thus, under some circumstances, be simplified considerably. Owing to the fact that the bearing is accommodated in the receiving region, it is possible, in some exemplary embodiments, for the actuating piston to be connected to the bearing so as to form a unit.

For this purpose, it may for example be provided that a component that comprises the first raceway and a component that comprises the second raceway of the bearing are held relative to one another in the receiving region. In some exemplary embodiments, it can also be made possible in this way for the bearing to be connected to the piston, and for further components for the installation of the bearing to be at least partially omitted. To hold the two components relative to one another in the receiving region, the components may for example be held in a position relative to one another and/or braced with one another.

The actuating piston may have a fastening structure. By means of the fastening structure, it is then possible for the actuating piston to be fastened to a counterpart fastening structure of the component that comprises the second raceway. In some exemplary embodiments, the bearing may thus be connected to the actuating piston, so as to form a unit, without further auxiliary means. For example, the piston may also have, in the receiving region, an abutment surface for the component with the first raceway.

Here, the fastening structure may for example be in the form of a fastening leg on the actuating piston. The fastening leg or the fastening structure may at least partially overlap the counterpart fastening structure in a radial direction of the bearing. In some exemplary embodiments, the fastening structure can thus be produced in a simple manner.

For example, the fastening leg or the fastening structure may be produced by bending and/or flanging of an end of a sheet-metal part of the actuating piston. Accordingly, under some circumstances, the fastening leg may be formed integrally on the actuating piston. This method of production may be expedient for example in situations in which the actuating piston is produced as a sheet-metal part. Here, beading and/or flanging may for example be regarded as referring to right-angled bending of an edge of a circular or oval metal sheet by way of a flanging machine and/or by hand.

In addition or alternatively, the counterpart fastening structure may be a face surface of the component with the second raceway. In some exemplary embodiments, a special adaptation of the bearing for use in the piston bearing unit can be omitted, and it may be possible for standard bearings to be used.

The counterpart fastening structure may optionally also be a shoulder on a surface, which faces in a radial direction, of the component with the second raceway. In some exemplary embodiments, it is thus possible for the actuating piston or the receiving region thereof to be formed with a shorter length than those in exemplary embodiments in which the fastening structure projects beyond a face surface of the component. It may be possible to realize a material and/or weight saving in relation to such components.

In some exemplary embodiments, the actuating piston additionally or alternatively has a U-shaped profile which encompasses the receiving region. Here, the receiving region is situated within the U-shaped profile and is delimited by a first leg and by a second leg arranged substantially parallel to the first leg. The two legs are connected to one another via a connecting section that delimits the receiving region in the radial direction of the bearing. The bearing lies against the connecting section at least in sections, in a radial direction, by way of a component that comprises the first raceway. In some exemplary embodiments, it can be made possible in this way for the piston to be produced as a shaped sheet-metal part with an extremely low weight.

The bearing may be, for example, an axial bearing that comprises two discs arranged parallel to one another, for example a housing disc with a first raceway and a shaft disc with a second raceway. A multiplicity of rolling bodies are guided between the two discs. In some exemplary embodiments, the actuating piston can, by way of the bearing, be decoupled from a rotational movement of the element to be actuated. It is accordingly possible, under some circumstances, for the actuating piston to be mounted rotatably relative to a clutch and/or a drive shaft, which clutch and/or drive shaft can rotate about an axis of rotation of the transmission without driving the actuating piston concomitantly.

In some embodiments, the actuating piston additionally or alternatively comprises a seal that is connected to the actuating piston. The seal may for example be a rubber lip that is vulcanized on. In some exemplary embodiments, it is accordingly possible for the number of individual parts to be installed to be reduced further. Under some circumstances, it is possible in this way for an O-ring or some other seal to be omitted.

BRIEF DESCRIPTION OF THE DRAWINGS

The exemplary embodiments disclosed in the above description, in the following claims and in the appended figures, and the individual features of the exemplary embodiments, can, both individually and also in any combination, be of relevance to, and implemented for, the realization of an exemplary embodiment in its different configurations.

FIG. 4 shows, in a schematic illustration, a partial sectional view of a piston bearing unit according to a further exemplary embodiment; and FIG. 5 shows, in a schematic illustration, a partial sectional view of a piston bearing unit according to a further exemplary embodiment.

DETAILED DESCRIPTION OF THE INVENTION

In the following description of the appended illustrations, the same reference signs are used to denote identical or similar components. Furthermore, combinatory reference signs are used for components and objects which appear multiple times in one exemplary embodiment or in one illustration but which are described jointly with regard to one or more features. Components or objects which are described using identical or combinatory reference signs may be of identical design, though may if appropriate also be of different design, with regard to individual features, multiple features or all features, for example dimensions, unless the description explicitly states otherwise or implicitly suggests otherwise.

Figure 1:
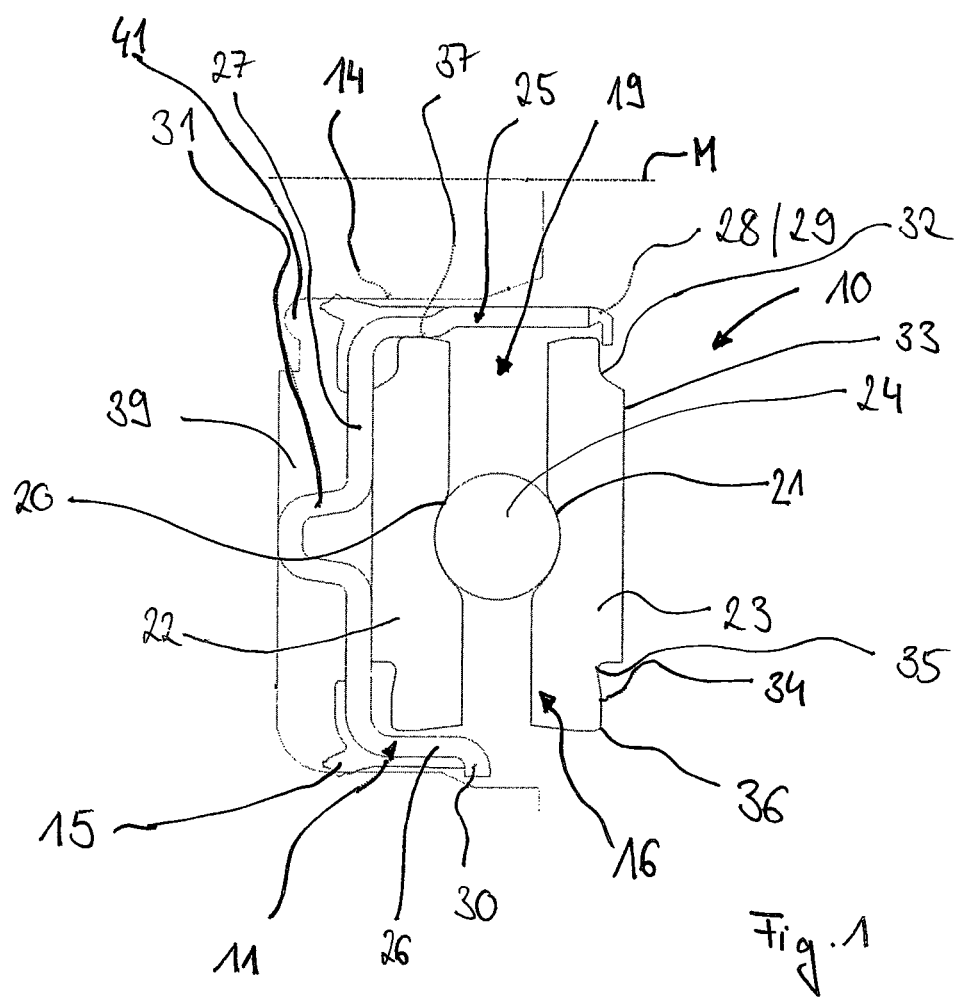
FIG. 1 shows, in a schematic illustration, a partial sectional view of a piston bearing unit according to one exemplary embodiment.

FIG. 1 shows, in a schematic illustration, a partial sectional view of a piston bearing unit 10 according to one exemplary embodiment. The piston bearing unit 10 comprises an actuating piston 11 having a receiving region 19. The actuating piston 11 is designed to actuate an element (not illustrated) by way of a linear movement parallel to an axial direction M. The element may be for example an input side of a clutch, a clutch pack, a switch, a valve or the like. Furthermore, the piston bearing unit 10 also comprises a bearing 16 having a first raceway 20 and a second raceway 21. The bearing 16 is designed for mounting the actuating piston 11 rotatably with respect to the element (not illustrated). The first raceway 20 and the second raceway 21 are each at least partially accommodated in the receiving region 19. It is thus possible for the bearing 16 to be held in the actuating piston 11.

The actuating piston 11, which is in the form of an annular piston, has substantially a U-shaped profile. The actuating piston 11 is produced as a bent sheet-metal part. In some further exemplary embodiments that are not illustrated, the actuating piston may also be produced in some other way, deep drawing, casting, cutting machining, and/or from some other material, metal, steel, aluminium, plastic, for example a thermoplastic and/or the like. Furthermore, in some further exemplary embodiments that are not illustrated, it is also possible for holes and/or openings to be formed in the actuating piston, which holes and/or openings permit a flow of oil into and/or out of the bearing for cooling and/or lubrication purposes. Here, the openings may for example be arranged in a metallic and/or thermoplastic section of an actuating piston leg which is situated on a side of the seal averted from the hydraulic chamber.

Here, the receiving region 19 is delimited in a radial direction by a first leg 25 and a second leg 26. The second leg 26 is arranged substantially parallel to and opposite the first leg 25. In the axial direction M, the receiving region 19 is delimited on one side by a connecting section 27 that connects the first leg 25 and the second leg 26 to one another. Here, the connecting section 27 is arranged substantially at an angle of 90° to the first leg 25 and to the second leg 26.

In some further exemplary embodiments that are not illustrated, the described arrangements, of the legs relative to one another and/or of the connecting section relative to at least one of the legs, may deviate from the described arrangements by an angle of up to 25° in any direction. The deviation may arise for example for reasons relating to production and/or other reasons.

The connecting section 27 has, substantially in the middle of its radial height, a stirrup-shaped bulge that extends away from the receiving region 19. The stirrup-like bulge is an axial abutment 31 for the actuating piston 11 in a housing 14 in which the actuating piston is arranged. In some further exemplary embodiments that are not illustrated, the axial abutment may also have some other form. A travel of the actuating piston in an axial direction may optionally also be delimited in some other way.

The first leg 25 is longer than the second leg 26. At an end averted from the connecting section 27, the leg 25 has a fastening structure 28. Here, the fastening structure 28 is in the form of a fastening leg 29 which, at least in sections, projects radially inward into the receiving region 19 of the U-shaped profile of the actuating piston 11. Between the fastening leg 29 and the leg 25 there is situated an undercut. Under some circumstances, improved hold of the bearing 16 in the receiving region 19 can be effected in this way.

The second leg 26 has, at an end averted from the connecting section 27, a rotation prevention means 30. The latter prevents the actuating piston 11 from rotating relative to the housing 14 in which it is arranged. The rotation prevention means 30 is situated on a hydraulic side. In the exemplary embodiment of FIG. 1, the rotation prevention means 30 is produced jointly during the bending of the actuating piston 11. Depending on the exemplary embodiment, the rotation prevention means may be produced from a metal, a plastic, a thermoplastic, a rubber and/or the like. Under some circumstances, it is also possible for a seal 15 (described in more detail further below) or a seal element of some other form to secure the actuating piston 11 against rotation. The function of the rotation prevention means is to prevent a torque from being transmitted from the bearing 16 to the actuating piston 11.

The bearing 16 is an axial ball bearing, in particular a thrust ball bearing. Between the two raceways 20 and 21 there is guided a multiplicity of rolling bodies, of which the illustration shows one rolling body 24 which is in the form of a ball. In this way, in some exemplary embodiments, friction can be reduced in relation to other bearings that have rollers and/or needles as rolling bodies, and/or radial guidance of the bearing unit can be simplified. In the axial direction M, two annular disc-shaped components 22 and 23 are arranged parallel to one another, the components each comprising one of the raceways 20 and 21. These are a housing disc and a shaft disc of the bearing 16. Depending on the bearing, the two components may be in the form of solid discs or rings or may also be in the form of thin sheet-metal bearing rings.

The two components 22 and 23 are in each case of identical form and have a recess 32 at an edge averted from the raceways 20 and 21 respectively. As a representative, only the component 23 will be described. The recess 32 extends from a surface, which is substantially parallel to the axial direction, of the first component to a face edge 33, which faces in an axial direction M, of the second component 23. For this purpose, as can be seen in the section, the recess 32 has a section which is arranged parallel or substantially parallel to a radial direction. Via a radius, the section adjoins the face surface 33. At an edge situated opposite in a radial direction, there is likewise arranged a recess 34, the latter recess likewise extending to the face surface 33. The recess 34 serves as a centring means for a return spring (not illustrated) for the actuating piston 11. In some further exemplary embodiments that are not illustrated, the first and/or the second component, or the described recesses, may also be of some other form. For example, at least one of the recesses may be omitted.

The first disc-shaped component 22, which comprises the first raceway 20 and which may also be referred to as housing disc, bears at least in sections against the connecting section 27 in the axial direction M. In this way, the first component 22, and the first raceway 20, are fixed in the axial direction. In the radial direction, the first component 22 is centred, by way of the first leg 25 of the actuating piston 11, at a centring means 37. Since the bearing 16 is an axial ball bearing, the centring of the first component 22 automatically also has the effect that the second component 23 with the second raceway 21 is centred via the rolling bodies 24. In some further exemplary embodiments that are not illustrated, the bearing may also be in the form of a rolling bearing of some other type of construction, for example a roller bearing, angular-contact ball bearing, tapered-roller bearing, needle-roller bearing or the like. Under some circumstances, it may then be the case, depending on the bearing type, that the centring of the component with the second raceway is not realized automatically via the rolling bodies. In these situations, the actuating piston may have, for example in its receiving region, an abutment for centring the component with the second raceway. In some cases, the bearing may also be in the form of a plain bearing or in the form of a radial bearing.

In the region of the centring means 37, the leg 25 is shaped such that the receiving region 19 has a relatively large diameter on a side of the leg 25 averted from the connecting section 27 as viewed from the centring means 37. Under some circumstances, the leg shape may also be selected in order that the seal 15 can be more effectively formed and/or cast moulded onto a radially outwardly facing surface of the U-shaped profile of the actuating piston 11. Similarly, the above-described rotation prevention means 30, which projects away from the receiving region 19 in a radial direction at the end of the leg 26, may serve as a forming aid or forming edge for the production of the seal 15 on the opposite side of the U-shaped profile. The seal 15 is vulcanized onto the actuating piston 11. In this way, the seal 15 is integrally connected to the actuating piston 11. In some further exemplary embodiments that are not illustrated, the seal may be formed onto the piston in some other way, for example by adhesive bonding, injection moulding and/or vulcanization.

The seal 15 is designed to seal off a pressure chamber 39, which is formed between the housing 14 and the actuating piston 11, with respect to a clutch side 40 or the surroundings. By way of the pressure chamber 39, the actuating piston 11 can be subjected to a pressure in order to perform a linear movement. The housing 14 or the pressure chamber 39 has a cutout 41 which may serve for preventing or at least reducing a deformation of the seal 15 when the actuating piston 11 is in a fully retracted position.

In the exemplary embodiment of FIG. 1, the bearing 16 is arranged in the receiving region 19 such that the actuating piston 11, by way of its leg 25, fully overlaps the first raceway 20 and the second raceway 21 in an axial direction. The two components 22 and 23 are fixed or braced relative to one another in the axial direction in the receiving region 19. For this purpose, the leg 25 engages by way of the fastening structure 28 into the recess 32, as counterpart fastening structure, on the second component 23. The leg 25 thus overlaps the second component 23 at least partially in the radial direction and also partially in the axial direction. In the exemplary embodiment shown in FIG. 1, the face surface 33 and a surface, against which the fastening structure 28 bears, in the recess 32 are arranged parallel to a radial direction. Correspondingly, the fastening structure 28 is also arranged parallel to a radial direction.

In some further exemplary embodiments that are not illustrated, the fastening structure and the counterpart fastening structure may also be of some other form as long as they allow the second component to be braced with the first component, and allow the bearing to be held in the receiving region. The bracing of the two components that have the raceways may refer for example to an installation process of the bearing such that the latter can perform its rolling bearing function and is held in the receiving region. Here, the bearing may be held in the receiving region in positively locking and/or non-positively locking fashion. In some further exemplary embodiments that are not illustrated, the face surface, the counterpart fastening structure and similarly also the fastening structure may each deviate from the described arrangement by an angle of up to 25° in any direction, and have only a radial direction component. This may also apply similarly to the shoulder.

For the holding of the bearing 16 in the receiving region 19, no further means are provided that are not part of the actuating piston 11. The piston bearing unit 10 may thus for example be installed and/or marketed in unipartite form. The actuating piston 11 thus follows or surrounds a shape of the bearing 16. In this way, in some exemplary embodiments and under some circumstances, it is possible for a material thickness of the actuating piston 11 itself to be reduced. The material thickness may be reduced both in a metallic and also in a thermoplastic part of the actuating piston 11. It is thus possible, in some exemplary embodiments, for the piston bearing unit 10 to be made more compact and/or more lightweight.

The second leg 26 overlaps the bearing 16 in the axial direction only as far as approximately an axial level at which the rolling bodies 24 are situated. The first component 22 does not bear against the second leg 26. In other exemplary embodiments that are not illustrated, the first component may also be centred on the second leg, and/or the second leg may comprise the fastening structure, or the second leg may overlap the bearing further in the axial direction, or even entirely.

The piston bearing unit 11 can be moved in the axial direction M under the pressure of a hydraulic fluid. The second component can rotate with the element that is to be moved with the actuating piston 11. The first component 22, or a fixed ring to which the actuating piston 11 is fastened, does not rotate. A rotation of the actuating piston 11 is prevented by the described rotation prevention means 30 or else by a seal that at least partially performs the function. The actuating piston 11 is decoupled from a rotational movement of the element by means of the bearing 16 arranged in the receiving region 19.

Figure 2:
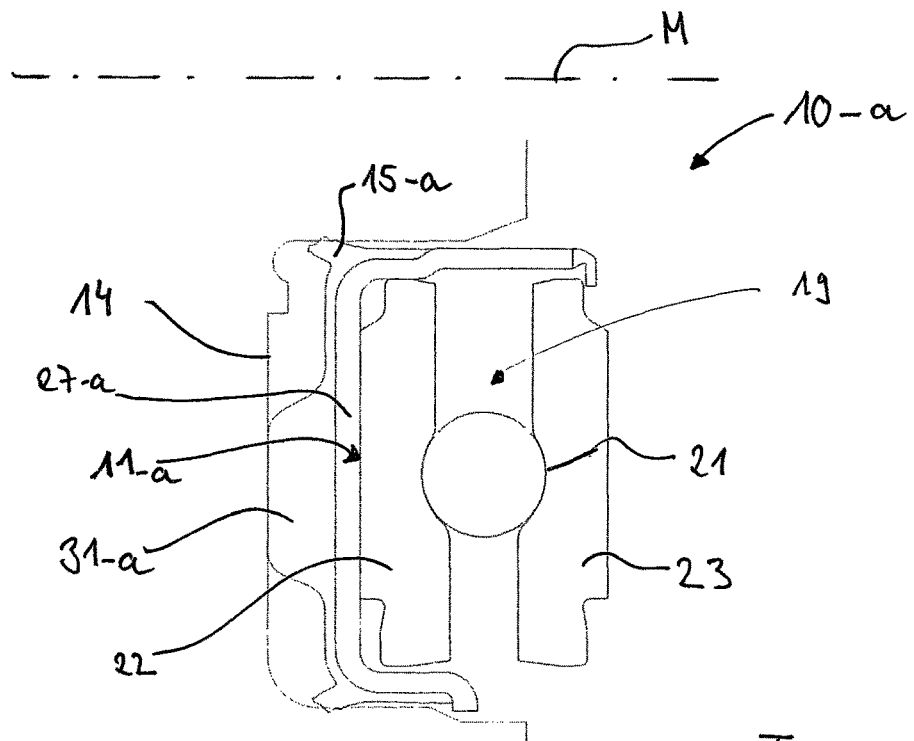
FIG. 2 shows, in a schematic illustration, a partial sectional view of a piston bearing unit according to a further exemplary embodiment.

FIG. 2 shows, in a schematic illustration, a partial sectional view of a piston bearing unit 10-a according to a further exemplary embodiment. The latter is substantially similar to that of FIG. 1. Only some differences will be described. Identical or similar components are denoted by the same reference sign, if appropriate with a suffix "-a".

The actuating piston 11-a is of substantially similar form to the actuating piston 11 but differs by an axial abutment 31-a. Whereas the axial abutment 31 is formed integrally from the material of the connecting section 27, the connecting section 27-a is of straight form and does not have a protuberance or bulge. Instead, the axial abutment 31-a is produced integrally with the seal 15-a from a polymer, an elastomer and/or a thermoplastic elastomer, and is fastened to an outer surface of the actuating piston 11-a.

Figure 3:
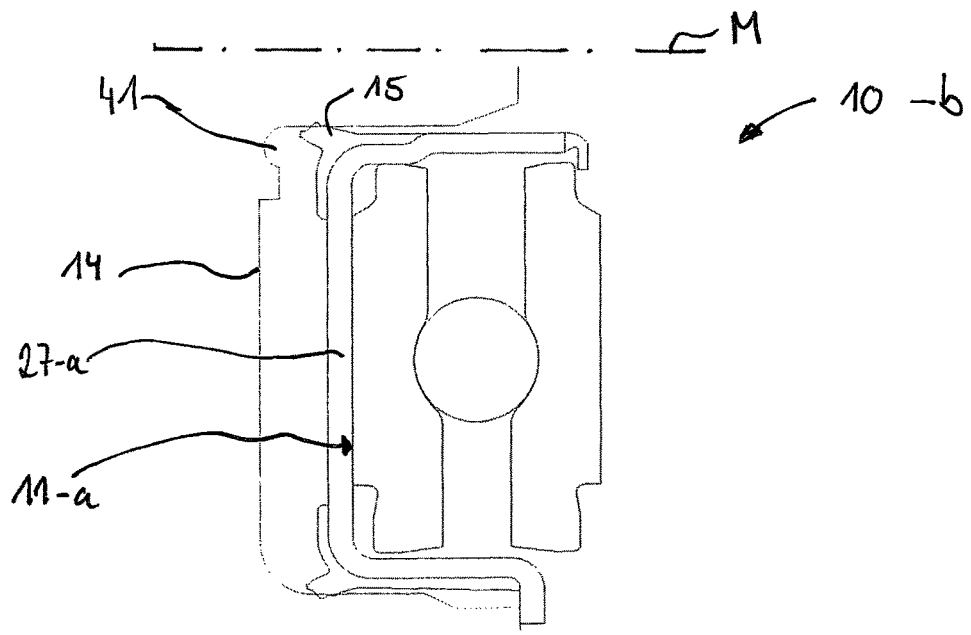
FIG. 3 shows, in a schematic illustration, a partial sectional view of a piston bearing unit according to a further exemplary embodiment.

FIG. 3 shows, in a schematic illustration, a partial sectional view of a piston bearing unit 10-b according to a further exemplary embodiment. The latter is substantially similar to FIG. 2. Only some differences will be described. Identical or similar components are denoted by the same reference signs, if appropriate with a suffix "-b".

The piston unit 10-b comprises the actuating piston 11-a with the connecting section 27-a which is of straight form and has no protuberance. No specific component is provided as an axial abutment. It is thus possible for the connecting section 27-a itself to serve for axial abutment against the housing 14. Under some circumstances, in this exemplary embodiment, the cutout 41 may be relevant in order to prevent and/or at least reduce a deformation, incorrect loading and/or excessive distortion of the seal 15 when the actuating piston 11-a is in a fully retracted position.

FIG. 4 shows, in a schematic illustration, a partial sectional view of a piston bearing unit 10-c according to a further exemplary embodiment. The latter is substantially similar to the exemplary embodiments described above. Only some differences will be described. Identical or similar components are denoted by the same reference signs, if appropriate with the suffix "-c".

The bearing 16-c is an axial angular-contact ball bearing. The first component 22-c and the second component 23-c are arranged so as to at least partially overlap in the axial direction M. Also, the bearing 16-c comprises a cage 45 for the purpose of guiding the rolling bodies 24. The first component 22-c, which can also be referred to as housing disc, has a rim 44-c which is arranged substantially parallel to the axial direction M and fully overlaps the rolling bodies 24 in the axial direction. The leg 26-c of the actuating piston 11-c fully overlaps the rim 44-c in the axial direction M but bears against the rim only in sections. In some further exemplary embodiments that are not illustrated, the two components may also bear against one another over their entire common length. At an axial end of the rim 44-c, the leg 26-c is bent so as to form a fastening structure 28-c which is arranged substantially parallel to the radial direction.

In the radial direction, the fastening structure 28-c bears against a surface 46, which faces in the radial direction, of the second component 23-c. The surface 46 comprises, as counterpart fastening structure, a shoulder 47 which has a greater diameter than the surface 46. The shoulder 47 is situated within the receiving region 19, such that the bearing 16-c is held in the receiving region 19. The shoulder 47 has a greater diameter than the radial surface 46 in a region which, as viewed in the axial direction M from the shoulder 47, is situated on a side facing toward the rolling body 24. The shoulder 47 is thus an elevation on the surface 46. In other exemplary embodiments that are not illustrated, the shoulder may also be a step in the surface. The shoulder or some other counterpart fastening structure may optionally also have some other form. Under some circumstances, the counterpart fastening structure is in the form of an undercut that makes it possible for the second component 23-c to be held on the leg 26-c, or on the fastening structure 28-c thereof, in the receiving region 19.

FIG. 5 shows, in a schematic illustration, a partial sectional view of a piston bearing unit 10-d according to a further exemplary embodiment. The latter is substantially similar to that of FIG. 4 and comprises a bearing 16-d which is an axial angular-contact ball bearing. Only some differences will be described. Identical or similar components are denoted by the same reference signs, if appropriate with the suffix "-d". The second component 23-d, which serves as a shaft disc, differs from the second components described above and has a radius or a bend at a side 48 averted from the raceway 21-d. At a radially outer end, the second component 23-d is bent in the direction of the rolling body 24. The fastening structure 28-d of the leg 26-d abuts against the bend of the averted side 48 as counterpart fastening structure. Here, the fastening structure 28-d makes contact with the second component 23-d at an axial level M at which substantially a mean width b of that section of the second component 23-d which is arranged in the radial direction is situated. In some further exemplary embodiments that are not illustrated, the fastening structure may also hold and/or secure the second component at some other region, for example at a region in which the second component has a greater radial extent than the counterpart fastening structure, such that an undercut is formed on which the second component is held.

Some exemplary embodiments thus relate to a piston bearing unit which may also be in the form of an axial thrust bearing piston unit, or to an arrangement of the axial thrust bearing 16 with the actuating piston 11, and with the seal 15 connected to the actuating piston 11, for an axial actuation of a rotating component. An axial thrust bearing or an angular-contact ball bearing may for this purpose for example be integrated in the actuating piston 11, which may also be referred to as "bonded piston" because it comprises the seal 15. The actuating piston 11 may, at least in sections, be covered by a seal 15 that adheres to the actuating piston 11. The seal 15 may for example be connected to the actuating piston 11. For this purpose, under some circumstances, use may be made of an adhesive agent. The actuating piston 11 with the seal 15 encompasses, secures, accommodates and/or centers the bearing 16, and/or holds the bearing 16 in combination with the fastening structure 28, which may also be in the form of a locking structure. A return spring may be fastened, centered and/or mounted on the axial thrust bearing.

The exemplary embodiments disclosed in the above description, in the following claims and in the appended figures, and the individual features of the exemplary embodiments, can, both individually and also in any combination, be of relevance to, and implemented for, the realization of an exemplary embodiment in its different configurations.

In some further exemplary embodiments, features that are disclosed in other exemplary embodiments as device features may also be implemented as method features. Furthermore, if appropriate, features that are implemented in some exemplary embodiments as method features may be implemented in other exemplary embodiments as device features.

LIST OF REFERENCE SIGNS

Ref. No. Description
10 Piston bearing unit
11 Actuating piston
14 Housing
15 Seal
16 Bearing
19 Receiving region
20 First raceway
21 Second raceway
22 First component
23 Second component
24 Rolling body
25 First leg
26 Second leg
27 Connecting section
28 Fastening structure
29 Fastening leg
30 Rotation prevention means
31 Axial abutment
32 Recess
33 Face surface
34 Recess
35 Undercut
36 Front edge
37 Centring means
39 Pressure chamber
40 Clutch side
41 Cutout
44 Leg on the first component
45 Cage
46 Surface
47 Shoulder
48 Averted side
M Axial direction/axis of rotation
b Mean width

The invention claimed is:

1. A piston bearing unit, comprising:
a bearing having a first raceway and a second raceway, wherein the bearing is designed for mounting the actuating piston rotatably with respect to an element;
an actuating piston that when viewed in cross section has a U-shaped profile which encompasses a receiving region, wherein the actuating piston is designed to actuate the element by way of a linear movement, wherein the U-shaped profile has a first leg and a second leg, the second leg being arranged substantially parallel to the first leg, the first leg and the second leg are connected to one another via a connecting section, wherein a first component, that comprises the first raceway, bears at least in sections against the connecting section, the second leg not radially overlapping the second raceway, a fastening leg which extends radially inwardly from an end of the first leg that is opposite from the connecting section;
wherein when viewed in cross-section the connecting section includes a centrally located bulge having a U-shape with portions of the connecting section on both sides of the centrally located bulge contacting a surface of the first component opposite from the first raceway:
wherein the first raceway and the second raceway are at least partially accommodated in the receiving region, wherein the first component with the first raceway and the second component with the second raceway are held relative to one another in the receiving region; the second component having a face surface that is oriented opposite from the second raceway, the face surface defining a recess along a radial edge thereof;
a counterpart fastening structure comprising at least one of:
the face surface of the component with the second raceway, and a shoulder on a surface, wherein the shoulder faces in a radial direction, of the component with the second raceway;
wherein the fastening leg extends into the recess in the second component so as to axially restrain the first and second components within the receiving portion, the recess being configured such that the fastening leg is axially spaced from the face surface.

2. The piston bearing unit according to claim 1, wherein the fastening leg forms a fastening structure which is designed for fastening the actuating piston to a counter part fastening structure of the second component, wherein the counterpart fastening structure of the second component comprises the second raceway.

3. The piston bearing unit according to claim 2, wherein the fastening leg at least partially overlaps the counterpart fastening structure in a radial direction.

4. The piston bearing unit according to claim 3, wherein the fastening leg is produced by at least one of bending and flanging of an end of a sheet-metal part of the actuating piston.

5. The piston bearing unit according to claim 1, wherein the bearing is an axial bearing, the bearing further comprising:
   a first disc with the first raceway, and
   a second disc with the second raceway,
   wherein the second disc is arranged substantially parallel to the first disc,
   wherein a multiplicity of rolling bodies are guided between the first disc and the second disc.

6. The piston bearing unit according to claim 1, the actuating piston further comprising a seal that is integrally connected to the actuating piston.

7. At least one of a clutch, a transmission and a locking differential, comprising:
   the piston bearing unit of claim 1, wherein the element to be actuated is an input side of a clutch.

* * * * *